United States Patent [19]

Giroux

BEST AVAILABLE COPY

[11] E Re. 29,471

[45] Reissued Nov. 15, 1977

[54] OIL WELL TESTING APPARATUS

[75] Inventor: Richard L. Giroux, Duncan, Okla.

[73] Assignee: Halliburton Company, Duncan, Okla.

[21] Appl. No.: 691,800

[22] Filed: June 1, 1976

Related U.S. Patent Documents

Reissue of:

[64] Patent No.: 3,814,182
Issued: June 4, 1974
Appl. No.: 340,778
Filed: Mar. 13, 1973

[51] Int. Cl.[2] ..... E21B 41/00

[52] U.S. Cl. ..... 166/334; 175/318

[58] Field of Search ..... 166/72, 331, 334; 175/318, 342; 251/58, 62; 137/460, 462, 495

[56] References Cited

U.S. PATENT DOCUMENTS

| | | | |
|---|---|---|---|
| 3,283,835 | 11/1966 | Kellner | 166/334 |
| 3,332,495 | 7/1967 | Young | 166/226 |
| 3,351,133 | 11/1967 | Clark, Jr. et al. | 166/72 |
| 3,405,764 | 10/1968 | Nutter | 166/226 |
| 3,435,897 | 4/1969 | Barrington | 166/331 |
| 3,442,328 | 5/1969 | Nutter | 166/226 |
| 3,446,280 | 5/1969 | Nutter | 166/331 |
| 3,494,421 | 2/1970 | Dollison | 166/315 |
| 3,499,487 | 3/1970 | Barrington | 166/331 |
| 3,703,104 | 11/1972 | Tamplen | 166/240 |
| 3,703,193 | 11/1972 | Raulins | 137/630 |
| 3,837,403 | 9/1974 | Mott | 166/331 |
| 3,850,242 | 11/1974 | Crowe | 166/324 |

*Primary Examiner*—James A. Leppink
*Attorney, Agent, or Firm*—Floyd A. Gonzalez; John H. Tregoning

[57] ABSTRACT

A ball valve type, full opening bore, oil well formation tester utilizes a J-slot mechanism and vertical tool string manipulations to open and close a substantially unrestricted axial bore through the testing tool to allow formation fluid flow through the tool at the command of the tool operator.

23 Claims, 24 Drawing Figures

OIL WELL TESTING APPARATUS

Matter enclosed in heavy brackets [ ] appears in the original patent but forms no part of this reissue specification; matter printed in italics indicates the additions made by reissue.

BACKGROUND OF THE INVENTION

This invention is directed towards testing underground formations in an oil well bore and is particularly useful for testing when a drill stem test is to be performed and it is desirable to be able to run tools through the drill stem and the tester to each areas in the drill string below the tester.

After an oil well has been encased and cemented, it usually becomes desirable to test the formations penetrated by the wellbore for possible production rates and general potential of the well. In doing so, a test string containing several different types of tools is utilized to determining the productivity of the well.

These tools might include a pressure recorder, a sample chamber, a closed-in-pressure tester, an hydraulic jar, one or more packers, a circulating valve, and possibly several other tools.

The testing procedure requires the opening of a section of the wellbore to atmospheric or reduced pressure. This is accomplished by lowering the test string into the hole on drill pipe with the tester valve and sample chamber closed to prevent entry of well fluid into the drill pipe. With the string in place in the formation, a packer below the tester is expanded to seal against the wellbore or casing to isolate the formation to be tested. Above the formation the hydrostatic pressure of the fluid in the wellbore is supported by the packer. The well fluid in the isolated formation area is allowed to flow into the drill string by opening the tester valve. Fluid is allowed to continue flowing from the formation to measure the ability of the formation to produce. The formation may then be closed in to measure the rate of pressure buildup. After the flow measurements and pressure buildup curves have been obtained, samples can be trapped and the test string removed from the well.

The difficulty with prior art testing devices is that they lack the ability to be openable and closable an indefinite number of times or else they fail to provide a fully open bore therethrough for full flow testing and the running of tools through the tester to the lower part of the drill string. In some areas, such as the North Sea, the cost of completing a well and testing are very high and it is extremely desirable to obtain the maximum amount of reservoir data from a single drill stem test.

The existing testers utilize flow passages through the walls, through annular spaces, or through restricted axial bores. Many can be opened and closed only one time. They require a "round trip" out of the hole and back into the hole with the tool string when it is desirable to run multiple flow and closed-in-pressure tests or when it is desirable to run a tool in the hole below the tester.

By the use of the present invention, it is not necessary to remove the test string from the well in order to run multiple flow and closed-in-pressure tests and the tester allows the running in of tools through the string to locations below the tester.

The advantages set out above are achieved in this invention by utilizing a full opening ball valve tool actuated by vertical reciprocation through a J-slot arrangement.

Other advantages embodied in the apparatus include an hydraulic metering system to regulate the opening time of the tester valve and a feature to bypass fluid trapped at hydrostatic pressure below the tester valve. The tester also incorporates a pressure balanced system to offset the natural buoyancy of the dry drill string in the drilling fluid and a shock absorbing system to prevent sudden applications of force on the valve mechanism thereby protecting it from damage and accelerated wear.

DESCRIPTION OF THE PREFERRED EMBODIMENTS

Figure 1A:
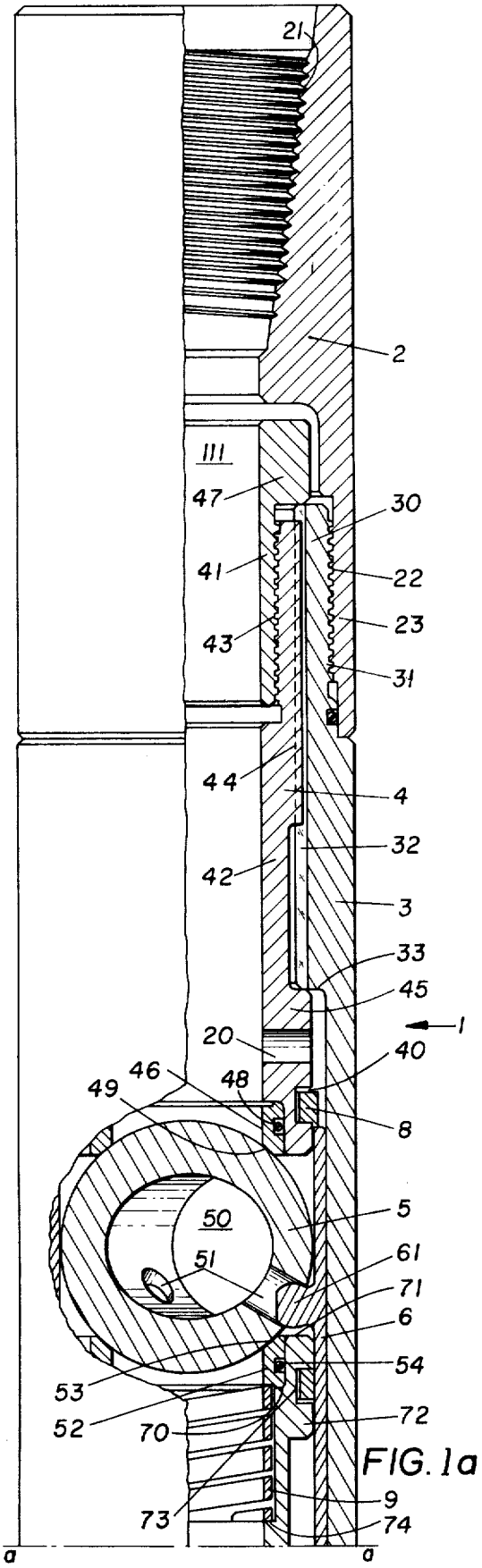
FIGS. 1a through 1g, when joined along common lines a—a through g—g, provide an enlarged, vertically sectioned, "right-side-only" view of the preferred embodiment of this invention.
Figure 1B:
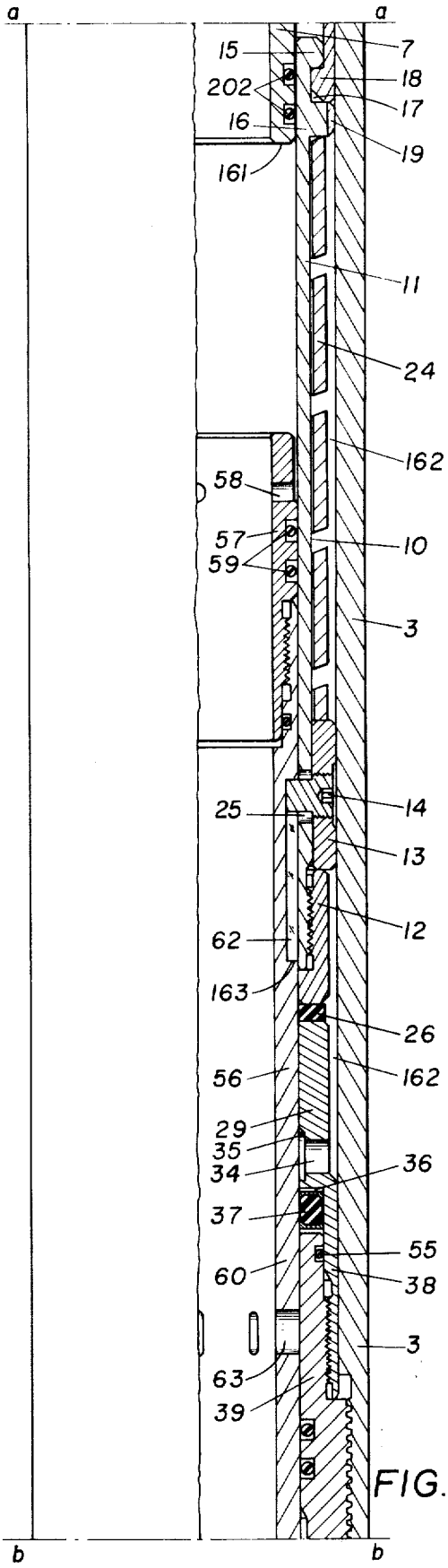
Figure 1C:
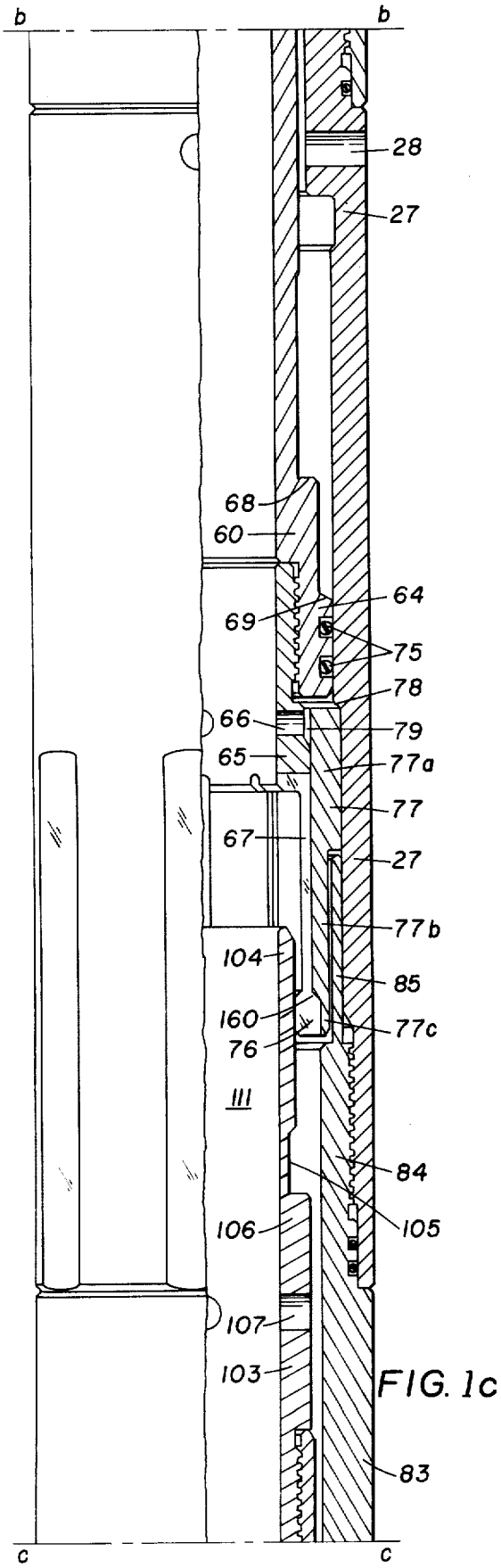
Figure 1D:
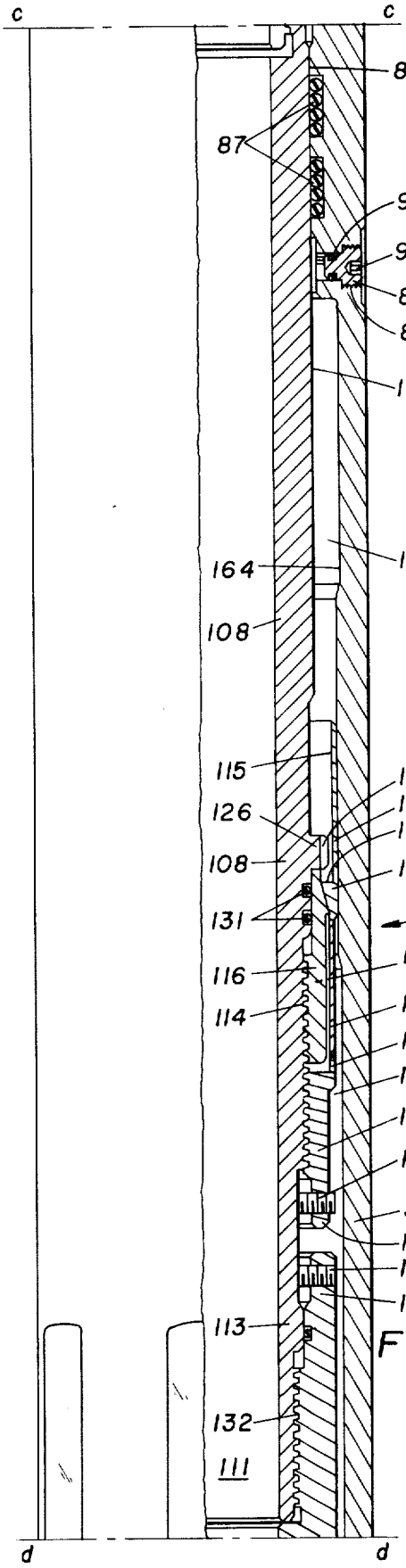
Figure 1E:
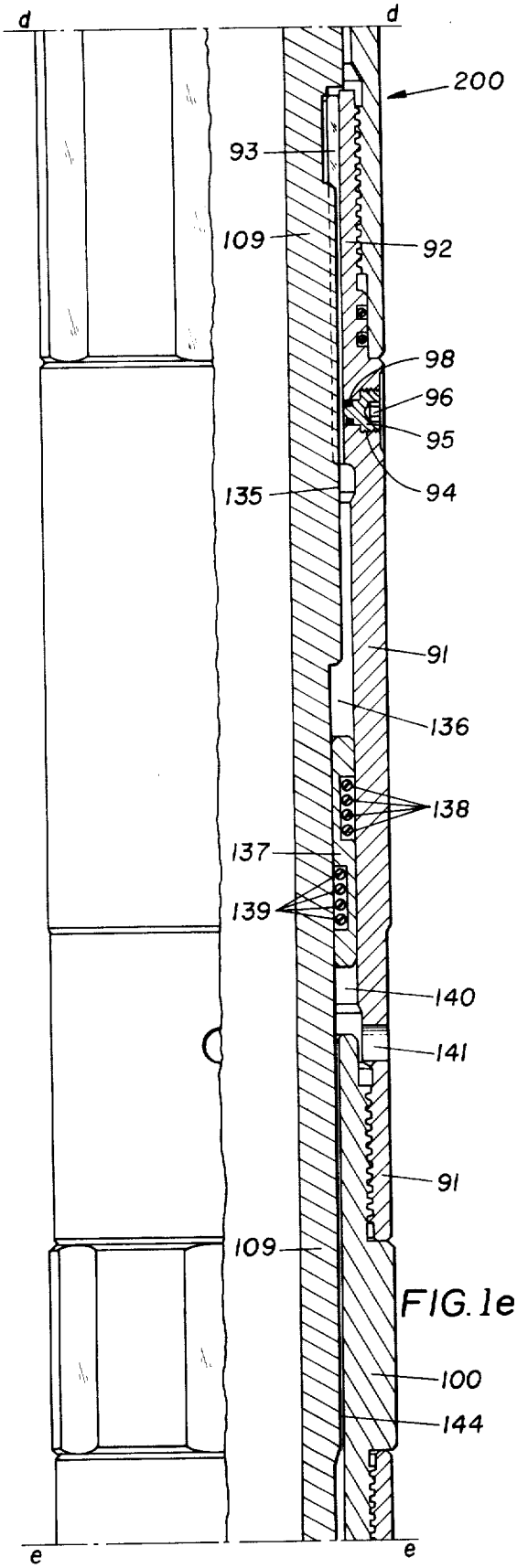
Figure 1F:
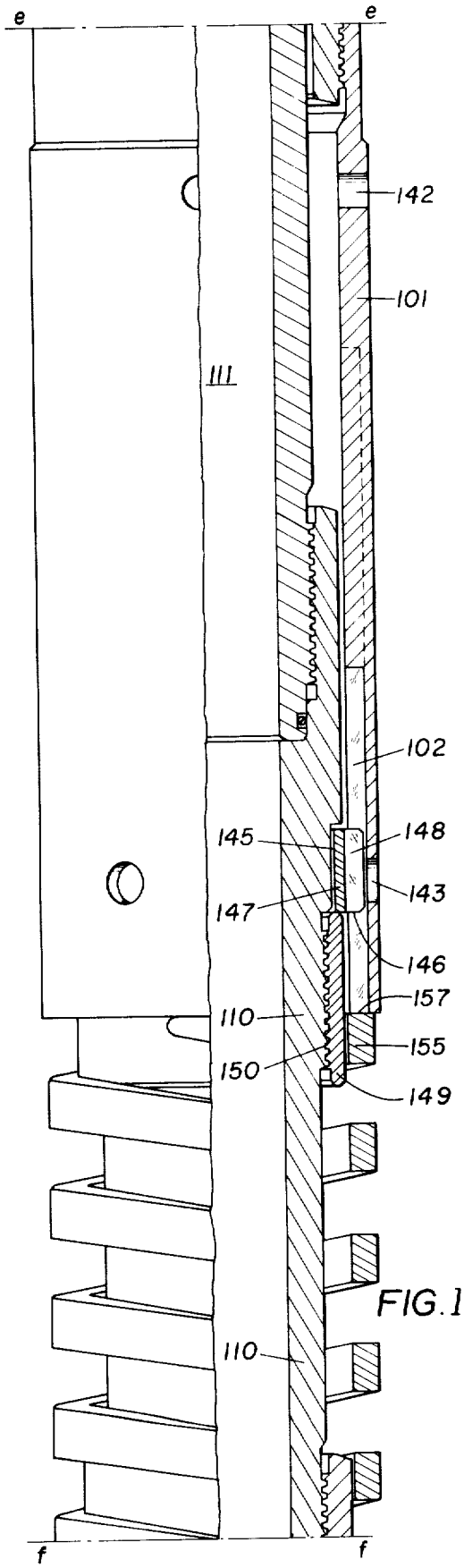
Figure 1G:
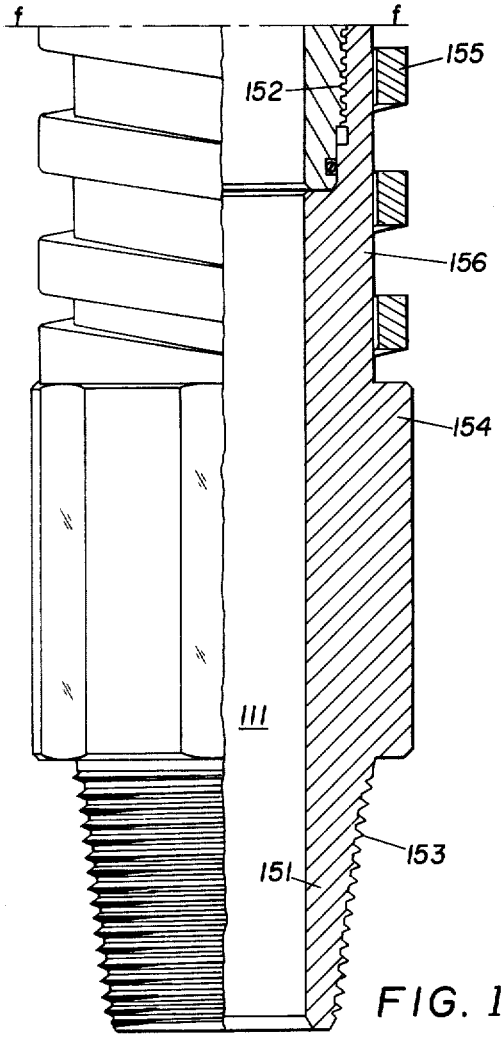

FIGS. 1a through 1g illustrate a partial cross section of the entire testing tool 1. Referring now to those figures, the formation testing tool 1 has an upper adapter 2 with internal threads 21 for attachment into the drill string and lower internal threads 22 on skirt section 23. Threadedly attached to adapter 2 is upper external cylindrical housing member 3 having external threads 31 on upper end 30 for engagement with threads 22 of adapter 2.

Located concentrically within adapter 2 and upper housing member 3 is a cylindrical tubular adjustment collar assembly 4 having an upper flanged cylindrical sleeve 41, and a lower vertically grooved tubular section 42 threadedly attached to sleeve 41 at threads 43. Section 42 has longitudinal vertical grooves 44 machined in the outer surface thereof for slidably receiving external splines 32 on upper housing 3.

Lower sleeve 42 has also an external annular shoulder or flange 45 thereon which abuts on internal annular shoulder 33 and splines 32 of housing 3. Upper sleeve 41 has an external flange 47 thereon which abuts the upper ends of splines 32 and housing 3. Splines 32, in conjunction with grooves 44, prevent rotation of lower sleeve 42 within housing 3. Downward rotational movement of upper sleeve 41 results in longitudinal movement of lower sleeve 42 until shoulders 45 and 47 have abutted housing 3 as illustrated. Shoulder 45 has one or more bypass ports 20 passing through the wall thereof.

An annular seating ring 46 having a circular seal 48 located thereon is concentrically located within lower flanged area 45 and has a concave seating surface 49 therein for contacting spherical ball valve 5.

Figure 2:
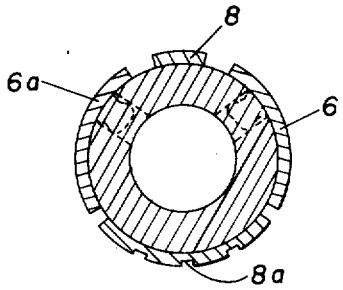
FIG. 2 is an axial end view that illustrates the proper arrangement of the pin actuating assembly around the ball valve.
Figure 3:
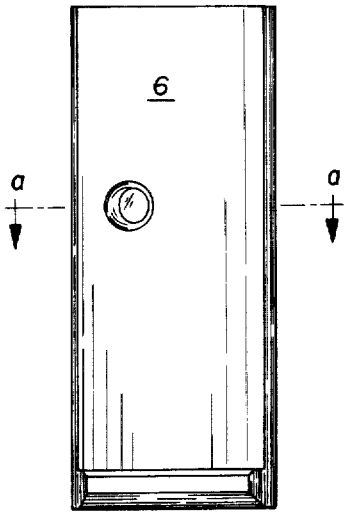
FIGS. 3 and 4 illustrate side elevational views of the two pin actuating sleeves.
Figure 4:
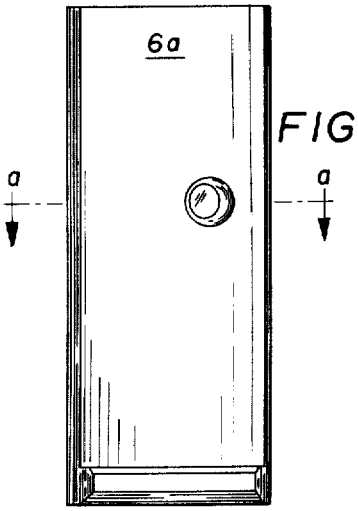
Figure 3A:
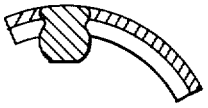
FIGS. 3a and 4a are cross sectional axial end views of the pin sleeves of FIGS. 3 and 4 taken at section lines a—a.
Figure 4A:
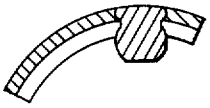
Figure 5A:
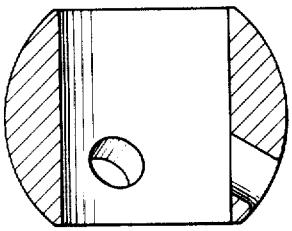
FIG. 5 shows the axial view of the ball valve of FIG. 1 looking along the longitudinal axis of the ball valve and FIG. 5a is an elevational cross sectional view of the ball valve of FIG. 5.
Figure 6:
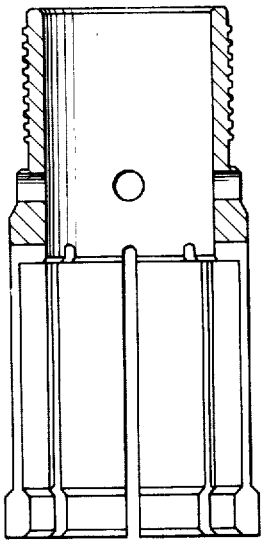
FIG. 6 is a side elevational cross sectional view of the collet sleeve.
Figure 7A:
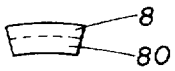
FIG. 7a is an end view of the connector portion taken at line a—a.
Figure 5:
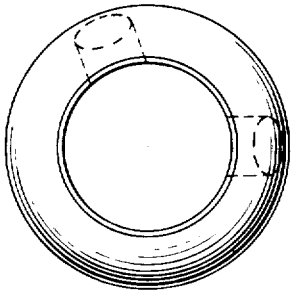
Figure 7:
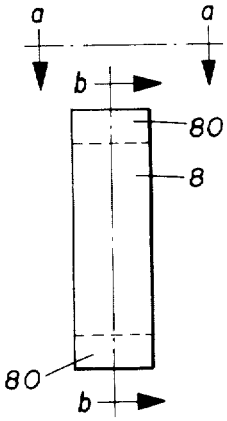
FIG. 7 is a side view of one of the connector portions of the pin actuating assembly within the tool as shown in FIG. 2.
Figure 6A:
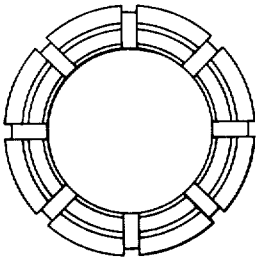
FIG. 6a is an end view of that sleeve.

Spherical ball valve 5, as shown in FIG. 1a and FIGS. 2, 5, and 5a, is a spherical ball made preferably of some hard, corrosion-resistant metal such as stainless steel, and having a relatively large cylindrical bore 50 passing axially therethrough. Ball valve 5 also has one or more actuating slots 51 in the wall thereof for receiving actuating pins 61 on a pin sleeve 6 whereby rotational movement is transmitted to the ball valve mechanism. A second pin sleeve 6a, as shown in FIGS. 3 and 4, is located approximately 120° around the bore of housing 3 from pin sleeve 6 and vertically aligned therewith.

A lower seating ring 52 contacts ball valve 5 diametrically opposite seating ring 46 and has concave annular surface 53 for providing full contact with ball valve 5. Seating surfaces 49 and 53 have curvatures substantially identical to the curvature of ball valve 5 to provide full contact pressure sealing. Seating ring 52 also has annular seal 54 for sealingly engaging the wall of annular recessed area 70 in lower valve collar 7. Collar 7 is a tubular cylindrical sleeve located concentrically within housing 3 and pin sleeves 6 and 6a, and has inner annular recessed area 70 in the upper end 71 thereof. The upper end 71 has a raised annular shoulder area 72 which contains an annular grooved channel 73. Similarly, the lower portion of lower sleeve 42 has an annular grooved channel 40.

Figure 8A:
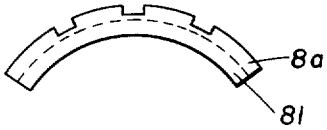
FIG. 8a is an axial end view of the second portion taken at line a—a.
Figure 8B:
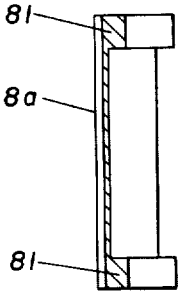
FIG. 8b is a cross-sectional view of the second portion taken at line b—b in FIG. 8.
Figure 7B:
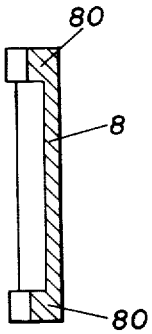
FIG. 7b is a cross sectional view of the connector portion taken at line b—b in FIG. 7.
Figure 8:
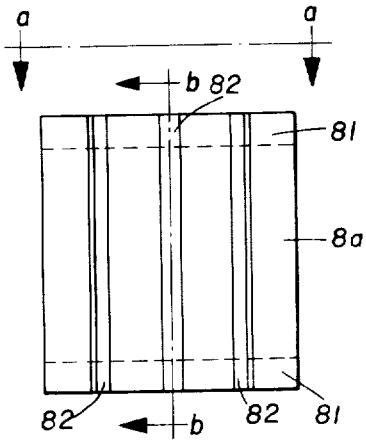
FIG. 8 is a side view of a second connector portion of the pin actuating assembly.

Channels 40 and 73 receive connector members 8 and 8a therein. Referring to FIGS. 7b and 8b, connector members 8 and 8a have inner annular flanges 80 and 81 located at the ends thereof and projecting radially inward, which flanges are adapted to fit within channels 40 and 73, thereby, through the relationship of connector members 8 and 8a, grooved channel 40, and lower channel 73, tying collar 7 to sleeve 42 together in substantially rigid relationship, thereby also supporting and partially enclosing ball valve 5 and seating rings 46 and 52. Fluid communication is provided along member 8a by means of one or more vertical grooves 82 in the outer wall thereof.

Coil spring 9 is located concentrically within collar 7 and is abuttingly received by seating ring 52 and inner annular shoulder 74 of collar 7 and provides a constant force tending to urge seating ring 52 into constant contact with ball valve 5.

Connector members 8 and 8a are cylindrically shaped partial sleeves comprising approximately 30° and 110° of arc respectively. FIG. 2 is an axial cross sectional view illustrating the arrangement of connector members 8 and 8a with pin sleeves 6 and 6a interspersed therebetween. It should be noted that the connector member 8 has been rotated out of position in FIG. 1 in order to show it in cross section and illustrate its connection with sleeve 41 and collar 7. Normally, connector 8 would not show in a cross sectional view which also shows pin sleeve 6.

A drive sleeve assembly 10 is concentrically located within housing 3 and passes slidably over collar 7. Sleeve assembly 10 is made up of upper tubular sleeve 11, lower nut 12, abutment ring 13, and one or more linkage pins 14 passing through sleeve 11 and threadedly engaged in ring 13. Sleeve 11 has one or more holes 25 substantially larger than pins 14 to allow said pins to pass therethrough.

Upper sleeve 11 contains a first annular shoulder 15 thereon at its top edge and a second annular shoulder 16 located a short distance below shoulder 15 to form a channel 17 which receives an internal annular shoulder 18 on the lower end of pin sleeves 6 and 6a. This arrangement effectively connects pin sleeves 6 and 6a to drive sleeve assembly 10.

It should be noted that shoulder 16 has external splines 19 on the outer periphery to contact the inner wall of housing 3 in sliding relationship yet still allow fluids to traverse shoulder 16. Fluid communication between sleeve 11 and collar 7 is prevented by circular seals 202 located therebetween.

A flat coil spring 24 encircles the upper portion of sleeve 11, abutting at its upper end against shoulder 16 and at its lower end against ring 13. A resilient bumper ring 26 is located adjacent the lower end of nut 12 to absorb impact shock of nut 12 upon downward movement thereof.

A second housing member 27 is threadedly connected to upper housing 3. Housing 27 is a cylindrical tubular member containing one or more hydrostatic balancing ports 28 through the wall thereof. The upper end of housing 27 passes concentrically within housing 3 and contains inner housing extension 29 threadedly attached thereto.

Extension 29 is a cylindrical tubular sleeve having an upper surface abutting against resilient ring 26, one or more ports 34 through the wall, said ports being connected by an annular groove 35 in the inner wall of extension 29, and an annular recessed area 36. Located in recess 36 is a circular seal ring 37. A skirt 38 of extension 29 extends downwardly over the upper end 39 of housing 27 and is threadedly attached thereto. Seal ring 55 is located between extension 29 and housing end 39 to prevent fluid leakage thereby.

Located concentrically and slidably within housing 27, extension 29, and drive sleeve assembly 10 is inner mandrel assembly 56 comprising upper tubular head 57, having one or more pressure equalization ports 58 therethrough and annular seals 59 thereon; mandrel body 60 having vertical grooved channels 62 therein to receive pins 14, one or more ports 63 through the wall thereof, and lower skirt section 64 at the lowest end; and snap connector sleeve [54] *65* having one or more ports 66 therethrough and a plurality of longitudinal spring fingers 67 projecting downwardly from the lower peripheral edge thereof. Skirt section 64 has raised annular shoulders 68 and 69 with annular seals 75 located on shoulder 69. Spring fingers 67 have thickened lower ends 76 forming inner and outer annular ridges thereon.

A limit stop collar 77 which is a generally cylindrical collar having a tubular upper section 77a and a reduced OD lower section 77b has an inner annular recessed portion 77c at its lower end to receive finger ends 76 therein. The upper end of collar 77 abuts on inner ridge 78 in housing 27 thereby preventing upward movement of connector 65 within housing 27 until fingers 67 are in a position to flex inward and disengage from stop collar 77. Ports 66 are primarily located in sleeve 65 to prevent hydraulic lock in compression or vacuum upon longitudinal movement of sleeve 65 with respect to housing 27 and collar 77. Annular space 79 communicates circumferentially with ports 66 to aid in pressure relief.

Located below and threadedly attached to external housing 27 is a second lower external housing member 83 having an upper inner skirt section 84 threadedly engaged with the lower end of housing 27 and an extended cylindrical ridge 85 integrally affixed to skirt 84. Ridge 85 fits concentrically and annularly between collar 77 and housing 27 and abuts the thicker portion 77a of collar 77. Ridge 85 and ridge 78 combine to prevent substantial movement of collar 77 in the housing.

Housing 83 contains a reduced ID section 86 which contains a plurality of sealing means 87 therein. Below seals 87 is located an air release port 88 in which is threadedly located a plug 89 having internal hexagonal inset 90 for receiving a hexagonal wrench head (not shown).

Threadedly and securedly attached to housing member 83 is a third lower housing member 91 having an internally splined upper section 92 containing a plurality of inwardly, radially projecting splines 93. A fluid filler port 94 is located through the wall of section 92 and contains a threaded plug 95 therein with hexagonal slot 96 for receiving a hex-head wrench (not shown). Threaded plugs 89 and 95 contain O-ring seals 97 and 98 to insure fluid-tightness around the plugs.

Housing 91 further contains one or more flow ports 141 through the wall thereof to communicate fluid pressure from the annulus area to the inner side of housing 91.

Figure 9:
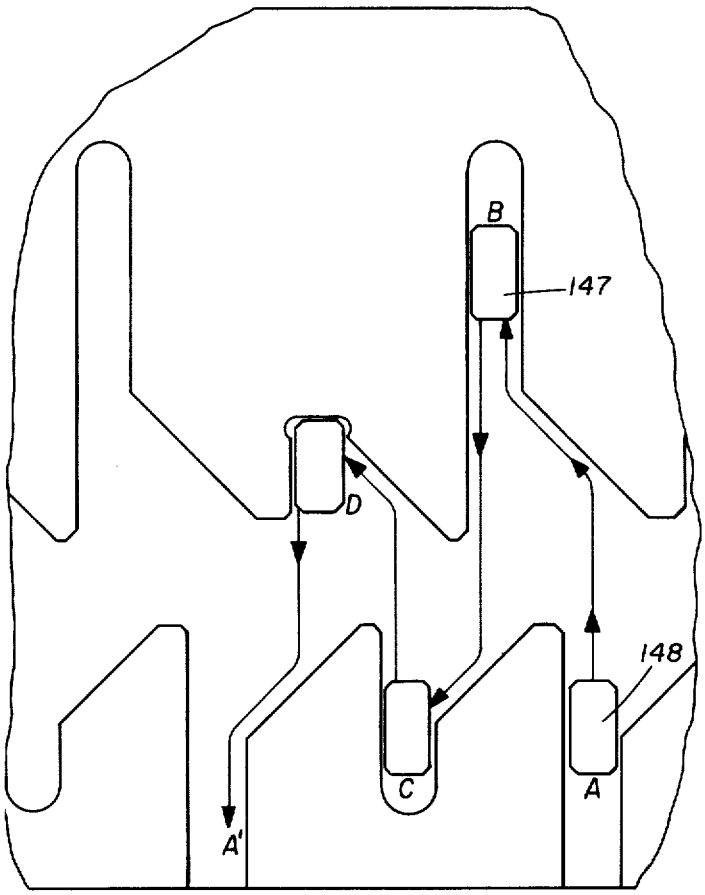
FIG. 9 illustrates a J-slot arrangement utilized in the tool.

A cylindrical connector collar 100 is threadedly attached to the lower end of housing 91 and serves to attach J-slot housing sleeve 101 to the external housing assembly. J-slot housing sleeve 101 has a multiple J-slot channel 102 machined in the inner wall thereof. The J-slot channel is shown in FIG. 9 in a "rolled-out," flattened orientation. This pattern is preferably formed three times in the wall of housing 101 so that each complete J-slot cycle covers 120 degrees of arc of the inner cylindrical surface of housing 101.

Figure 10:
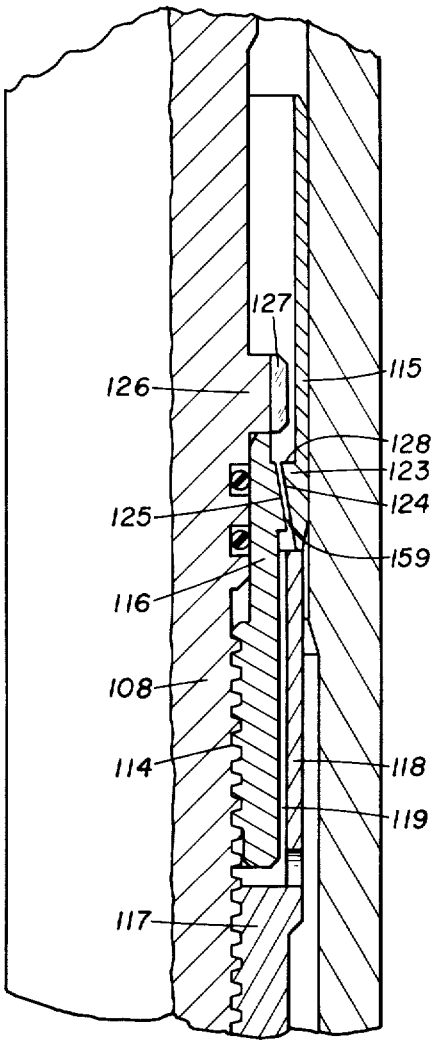
FIG. 10 is an enlarged view of the hydraulic impedance mechanism of the tool taken at the encircled section of FIG. 1.

Located slidably and concentrically within housing assembly 200 comprising housings 83 and 91, collar 100, and housing 101 is the J-slot mandrel assembly 112 comprising a snap connection receiver mandrel 103 having a relatively thin upper skirt portion 104, a snap-finger receiving channel 105, and a thicker body section 106 with one or more ports 107 through the wall of body section 106; upper hydraulic mandrel 108; lower hydraulic mandrel 109; and J-slot inner mandrel 110. Mandrel sections 103, 108, 109, and 110 are each threadedly connected together in coaxial alignment and comprise generally cylindrical tubular members having an open bore 111 therethrough which bore extends from upper adapter 2 through sleeves 41 and 42, collar 7, drive sleeve assembly 10, inner mandrel assembly 56, and the J-slot mandrel assembly 112. Upper hydraulic mandrel 108, attached to and located directly below snap mandrel 103, comprises an elongated tubular section having a doubly-threaded lower skirt section 113. Section 113 has upper threads 114 for receiving an hydraulic impedance valving system 122 comprising a cylindrical distensible barrel 115, a tapered-end orifice sleeve 116 and an adjustable limit nut 117 having a shroud sleeve abutment collar 118 integrally formed thereon. Collar 118 is arranged to pass upwards over sleeve 116 yet maintain an annular space 119 therebetween. Furthermore, collar 118 has one or more flow ports 120 therethrough providing fluid communication from annular space 119 to annular space 121 between housing 83 and mandrels 108 and 109. Referring to FIG. 10, this is an enlarged view of the hydraulic impedance valving system 122. In this illustration, barrel 115 has a thickened lower section 123 having a conically tapered inner shoulder having wedge surface 124 which is conically tapered, diverging in a downward direction. The taper of surface 124 substantially matches the taper of surface 125 on sleeve 116 allowing surface 124 to parallel surface 125 thereby providing a metering orifice channel 159 between surfaces 124 and 125.

Collar 118 of nut 117 is arranged to abut the bottom end of barrel 115 and determine the amount of gap between surfaces 124 and 125. This is adjustable by threaded rotational movement of nut 117 upward or downward on threads 114. An annular shoulder 126 is integrally formed on mandrel 108 to provide a stop for threading sleeve 116 upward on the mandrel. Sleeve 116 will preferably always be snugly tightened against shoulder 126. On the outer periphery of shoulder 126 are splines 127 to allow fluid flow thereby while providing an inner support for barrel 115 plus an upward stop to prevent barrel 115 from moving upward out of position with respect to sleeve 116. This upward travel limit is provided by abutment of shoulder surface 128 of section 123 with splines 127.

By proper adjustment upward or downward of nut 117 on threads 114, the annular metering orifice 159 can be formed by the separation of surface 124 from surface 125, and the impedance rate of this orifice can be adjusted as desired by the threading upward or downard of nut 117. Once nut 117 has been adjusted at the desired preset position, one or more lock screws 129 passing through a lower skirt section 130 of nut 117 can be tightened down against mandrel 108 to prevent any unwanted movement of the nut. Seals 131 on mandrel 108 inside sleeve 116 prevent fluid leakage between mandrel 108 and sleeve 116.

The mode of operation of valve assembly will be considered later in discussing overall operation of the tool.

As mentioned previously mandrel 108 has a doubly-threaded skirt section 113 containing threaded area 114 and also a lower threaded section 132 upon which is threaded lower mandrel 109. A set screw 133 passing through an upper extended collar section 134 is threaded into tightly abutting relationship with mandrel skirt 113 to firmly anchor mandrel 109 to mandrel 108.

Mandrel 109 has external splined area 135 adapted to receive splines 93 of housing 91 in relatively close fitting relationship to prevent rotation of the mandrel assembly within the housing assembly. Furthermore, below splines 93 and 135 housing 91 and mandrel 109 are arranged to form hydraulic fluid chamber 136 in which is located a floating annular piston 137 having seals 138 and 139 therein arranged to seal against housing 91 and mandrel 109 respectively.

Piston 137 divides chamber 136 from chamber 140. Chamber 136 is preferably filled with an inert hydraulic fluid such as oil, whereas chamber 140 may have well fluids therein communicating through one or more ports 141 through the wall of housing 91 to the annular fluids outside the tool. Pressure through ports 141 is further suplemented through ports 142 and 143 passing through the wall of J-slot housing 101 and upwards through annular space 144 between connector 100 and mandrel 109.

Threadedly attached to the bottom end of mandrel 109 is J-slot mandrel 110 having a recessed shoulder area 145 thereon which carries a rotatable lug ring 146. Lug ring 146 comprises an annular ring 147 which carries a projecting lug 148 thereon. Since the J-slot housing may have a plurality of J-slot patterns machined therein, it would be possible to have a projecting lug on ring 147 for each numer of repeated cycles of the J-slot pattern. For instance, in this embodiment, the J-slot pattern utilizes 120° of the circumference of housing 101 so therefore there will be three identical J-slot cycles machined into the housing and there could possibly be one, two, or three lugs on ring 147 120° apart to engage in the J-slot patterns. The number of patterns and lugs is limited only by the physical size of the J-slots and the required space for sufficient J-slotting to provide the required mechanical actions.

The lug ring 146 is maintained on recessed shoulder 145 by a threaded nut 149 which screws onto threads 150 located on J-slot mandrel 110 and prevents by abutment any substantial downward movement of lug ring 146 from shoulder 145. Nut 149 is arranged to abut shoulder 145 when fully threaded to limit upward movement of the nut on the mandrel and to maintain proper spacing between lug ring 146 and mandrel 110 and nut 149 so that ring 146 will be free to rotate circumferentially while having only negligible freedom for vertical movement on mandrel 110.

At the lower end of mandrel 110 is bottom adapter 151 threadedly attached to mandrel 110 at threads 152 and having lower threaded section 153 for connecting into a standard test string. Adapter 151 further has an external annular shoulder 154 formed thereon which receives the lower end of compressed coil spring 155 in abutting relationship and which coil spring 155 encircles upper skirt 156 of adapter 151, the lower end of mandrel 110, and a portion of nut 149 which extends below the lower end 157 of housing 101. Spring 155 abuts the lower end 157 and provides a force tending to move the inner mandrel assembly 112 downward, out of the housing assembly 200.

OPERATION OF THE PREFERRED EMBODIMENT

In typical well testing operation, the formation tester 1 is placed in the test string (not shown) which contains one or more well packers (also not shown) with at least one packer being located in the string below the tester 1. The tester 1 is placed in the string in the closed position as indicated in FIG. 1.

As the test string is run in the hole, hydrostatic pressure flows through ports 28 and reacts against differential pressure areas 68 and 69 which separate the hydrostatic pressure from generally atmospheric pressure reacting through bore 111 and ports 66 to the back side of skirt section 64. The action of hydrostatic pressure acting downward against areas 68 and 69 offsets the buoyancy of the tool when entering the fluid in the well bore. Preferably the annular surface area of annular surfaces 68 and 69 is equal to or greater than the cross sectional area of bore 111 which bore area creates the buoyancy problem of the apparatus when entering a well bore containing fluid.

In addition to the pressure balancing feature just described, coil spring 155 provides further resistance against the buoyancy forces tending to force mandrel assembly 112 into the housing assembly 200.

Simultaneously, as the tool string enters the wellbore, annulus fluid transfers the increasing hydrostatic pressure to piston 137 via ports 141 which in turn places this hydrostatic pressure on impedance fluid in chamber 136 and surrounding valve assembly 122. Impedance fluid is placed in this area prior to assembling the tool in the test string by inserting the fluid through filler port 88 while drawing off entrapped air through port 94.

When the drill string reaches the depth that places the testing tools at the required location, the packer or packers below tester 1 are set thereby anchoring the string in the hole. This may be accomplished by commercially available packer means which can be operable by applications of pressure to the annular fluids, or through physical manipulations of the string to cause it to expand to seat against the well casing.

When the packer is seated and the drill string anchored and it is desirable to open the ball valve assembly 5 and allow formation fluid to flow, a predetermined weight is set down on the string which serves to begin compression of coil spring 155 and move mandrel assembly 112 into the housing assembly. During this movement, the lug or lugs 148 on the lug ring 147 begin upward movement with mandrel assembly 112.

Referring to FIG. 9, when the tool is placed into the test string, the lug and J-slot arrangement is substantially as shown at position A. When weight is set down on the string, the lug begins moving upward in response to the telescoping together of the mandrel assembly 112 into the housing assembly until the lug reaches position B which is the full open position and no further telescoping can occur. The tester will remain open, in position B, as long as weight remains on the string.

When it is desirable to close the tool, the weight is picked up on the string which moves mandrel assembly 112 back out of housing assembly 200 in response to spring 155, and lug 147 moves to position C in the J-slot where, for convenience, the weight of the string can be released moving lug 147 to position D which is also a closed position, whereupon the tester will remain closed and be held there by the string weight, or additional weight can be placed on the string if desired to maintain the tester in a closed orientation.

When it is desirable to open the valve again, the string is picked up once more which moves lug 147 down to position A' of the second J-slot cycle which corresponds to position A of the first J-slot cycle and the above procedure of applying and removing weight on the string can be repeated. As can be seen, the tester can be opened and closed indefinitely by following this procedure.

A more detailed description of how the rest of the tool operates is in order. As weight is initially applied to the string and the mandrel assembly begins upward telescopic movement into the housing assembly, spring 155 begins to compress and offer resistance to the movement. Simultaneously, the mandrel assembly begins to force distensible barrel 115 upward in hydraulic impedance chamber 158. Due to the incompressibility of the hydraulic fluid, the distensible barrel is expanded outward into sealing contact with the inner wall of housing 83 thereby effectively sealing off chamber 158 from all means of pressure relief except the annular orifice channel 159 between tapered surfaces 124 and 125. The orifice channel 159 serves to relieve pressure in chamber 158 but can only flow at a predetermined rate which thereby controls the rate of movement upward of the inner assembly 112 within the outer assembly 200. Ports 141, 142, and 143 allow movement of well fluid in and out of the annular spaces between the inner mandrels and the outer housing to prevent any hinderance to movement arising from hydraulic lock occurring because of entrapped fluid in the annular areas.

Mandrel assembly 112 continues to move carrying sections 103, 108, 109, 110, 151, 115, 116 and 117 upward until channel 105 has moved sufficiently upward to engage finger ends 76. Upward movement of mandrel 103 pushes fingers 76 against the sloped surface 160 of section 77c until the fingers are compressed radially inward and are cleared of surface 160 which then frees inner mandrel assembly 56 to move upwardly with mandrel assembly 112.

The upward movement of assembly 56 then continues at the same predetermined impeded rate until ports 63 pass upward through seal ring 37 whereupon the hydrostatic pressure trapped in the lower end of the tool, below the ball valve and below the lower seated packer, is allowed to drain off through the bypass assembly to the upper side of the ball. This relieves the hydrostatic pressure which was acting upon the lower end 161 of collar 7 which was forcing it and seating ring 52 upward against ball 5 to provide a fluid tight seal while going in the hole. The relief of the entrapped hydrostatic pressure removes pressure from the ball and allows easy manipulation of it into the open position.

Bypass of the fluid under hydrostatic pressure can be traced from bore 111, (below ball 5) through ports 63 and 34, along the annular space 162 between drive sleeve assembly 10 and upper housing 3, through the gaps between pin sleeves 6 and 6a and connector members 8 and 8a, and through ports 20 into bore 111 above ball 5.

At this moment the drill string is partially opened to flow, although only slight, from the formation up the drill string through the above described bypass mechanism, and the string will probably lose its buoyancy since the string usually fills with formation fluid. The effect of losing buoyancy is for the weight of the string to be pressed downward against the packer which attempts to compress the telescopic sections of the tester. This is counterbalanced by the previously described pressure balancing feature of differential pressure areas 68 and 69 which continue to be effective since high hydrostatic pressure continues to push down on top of surfaces 68 and 69, which high pressure is resisted only by the relatively low formation fluid pressure on the lower side of section 64.

Upon the relief of hydrostatic fluid pressure across the ball valve through the bypass mechanism, the lower ends 163 of grooves 62 come into contact with the inwardly extending ends of linkage pins 14 which moves the pins upward in slots 25 until they contact the upper ends of slots 25. This small amount of movement, around 1/16 to ¼ inch, serves to slightly compress coil spring 24. Upon abutment of pins 14 with sleeve 11, continued upper movement of mandrel assembly 56 upward results in movement upward of drive assembly 10 and pin sleeves 6 and 6a which in turn engages pins 61 in slots 51 of ball 5 and begins rotational movement of ball 5 toward the fully open position. After a partial movement of ball 5 toward the open position, barrel 115 moves upward into a section 164 of housing 83 which section 164 has an expanded ID (inner diameter) and allows fluid to bypass around the outside of barrel 115 which cannot expand sufficiently to seal against the surface of section 164. Thus the hydraulic impedance system is short-circuited or bypassed and the remaining upward movement of mandrel assembly 112 and drive assembly 10 occurs relatively rapidly which moves ball valve 5 into an almost completely open position. This sudden movement is transmitted through the test string to the operator at the surface who then knows that the tester is opened and test data can then be recorded. At the end of the sudden upward movement of the mandrel assembly and drive assembly, the strong upward surge of sleeves 6 and 6a is absorbed enough by coil spring 24 to prevent damage of pins 61 acting against the inertia and friction of ball 5. Upon completion of the upward movement of mandrel assembly 112 and drive ssembly 10, coil spring 24 moves ball 5 the final small amount to provide a fully opened valve and align bore 50 with bore 111 through the tool.

As previously described, the tool is closed by picking up weight on the drill string to move lugs 148 into position C (of FIG. 9) and then setting down weight to move the lugs to position D of the J-slot. Upward movement of the outer housing assembly telescopes the outer assembly out from the inner mandrel assembly which is prevented from moving upward along with the housing assembly by the biasing action of spring 155. Furthermore, the hydraulic impedance system does not impede movement of the mandrel assembly downward inside the housing assembly since the barrel 115 is not pressed downward to restrict annular orifice channel 159.

SUMMARY OF THE ADVANTAGES OF THE INVENTION

One distinct advantage of the apparatus of this invention is that it provides a testing tool for taking closed-in-pressure tests, which tool has a straight-through bore which is substantially unrestricted throughout the valve assembly and the rest of the tool.

While the full opening tools are available, they suffer from the disadvantage of being operable only one time. In high-risk, offshore drilling areas and extremely cold regions, it is desirable to obtain as much reservoir data as possible on each trip into the hole with the test string. This necessitates a straight-through, open bore tester which is operable numerous times. The apparatus of this invention provides such a tool in that it is openable and closable an indefinite number of times without pulling the string from the wellbore.

Other advantages include the easy opening ball valve which is made possible by the hydrostatic pressure bypass feature as described previously. Another advantage includes the time delay hydraulic metering system which aids the operation of the tool by allowing time for the hydrostatic bypass feature to be actuated. Furthermore, the hydraulic impedance system works as a shock dampener to reduce damage and wear of the mechanical parts in the apparatus and, in addition, prevents premature opening of the tester should a temporary obstruction be encountered while the string is being lowered into the well.

Further features of the apparatus involve the pressure balancing system to offset buoyancy when going in the hold and to lessen the effect of buoyancy loss after the packer is set and the bypass function occurs, wetting the string. Also, the shock absorption feature of the three coil springs utilized in the apparatus aid in furthering the useful life of the tool.

One further advantage to be noted is the J-slot arrangement which allows the tool to be closed and receive the entire tool string weight plus additional weight if necessary. This is both a convenience and a safety feature.

Although a specific preferred embodiment of the present invention has been described in the detailed description above, the description is not intended to limit the invention to the particular forms or embodiments disclosed herein, since they are to be recognized as illustrative rather than restrictive and it will be obvious to those skilled in the art that the invention is not so limited. For example, the tool of this invention can be utilized without the J-slot arrangement and the lower coil spring 155. Or, alternatively, other spring biasing means such as a compressible inert gas chamber could be used in place of any one or all of the disclosed mechanical spring biasing systems.

Furthermore, it is contemplated that some configuration other than spherical could be used for the ball valve member 5; for instance, a tapered cylindrical valve member might be used.

The system could be utilized without the J-slot system and lower coil spring by increasing the pressure balancing areas 68 and 69 to a sufficiently larger size than the inner bore cross sectional area 50 that the hydrostatic pressure acting on areas 68 and 69 would keep the tool in an extended position when going in the hole. The tool would then be activated merely by simple up and down vertical reciprocation by placing enough weight on the string to overcome hydrostatic pressure on areas 68 and 69. Thus, the invention is declared to cover all changes and modifications of the specific example of the invention herein disclosed for purposes of illustration, which do not constitute departures from the spirit and scope of the invention.

What is claimed is:

[1. Apparatus for testing the productivity of oil bearing formations penetrated by a borehole, said apparatus comprising:

housing means arranged to be inserted into a string of testing tools and drill tubing; said housing means having a substantially open bore therethrough;

mandrel means slidably received in and attached to said housing means and adapted to telescope selectively with respect ot said housing means and coaxially aligned therewith; said mandrel means having a substantially open bore therethrough;

valve means in said housing means arranged to be activated by sliding movement of said mandrel means relative to said housing means at a preselected moment; said valve means arranged to open and close said open bore through said housing means in response to the upward and downward sliding movement of said mandrel means relative to said housing means, respectively;

means interconnecting said mandrel means and said valve means for activating said valve means in response to reciprocation of said string of testing tools in said borehole.]

2. The apparatus of claim [1] *24* further comprising pressure balancing means within said apparatus communicating from the area exterior to said apparatus to differential pressure means within said apparatus, said pressure balancing means arranged to offset the buoyancy of said string of testing tools when going into a borehole containing liquid.

3. The apparatus of claim [1] *24* further comprising impedance means between said housing means and said mandrel means arranged to impede [upward] movement of said mandrel means with respect to said housing means *toward the contracted position* and, alternately, to provide substantially no impedance to [downward] movement of said mandrel means with respect to said housing means *toward the expanded position.*

4. The apparatus of claim [1] *24* further comprising:

spring biasing means acting between said mandrel means and said housing means and arranged to maintain said mandrel means [telescoped] *in the expanded position* with respect to said housing means in such a manner as to maintain said valve means closed; and a pressure bypass system in said mandrel means adapted to be activated at a preselected time to relieve hydrostatic pressure entrapped below said valve means; said bypass system, when activated, communicating *through ports adjacent the connected end and in the wall of said flow tube for communicating* said *housing means* bore [area above] *on one side of* said valve means to said *mandrel means* bore [area below] *on the other side of* said valve means.

5. The apparatus of claim [1] *24* wherein said valve means further comprises a rotatable ball valve sealingly and rotatably located within said testing apparatus, said ball valve comprising a generally spherical member having a relatively large, open, cylindrical bore passing axially therethrough, arranged in one position to be aligned with and to communicate with the bore of said housing means and the bore of said mandrel means, and further arranged in a second position to be sealingly isolated from said housing means bore and said mandrel means bore.

6. The apparatus of claim [1] *24* wherein said means for activating said valve means is characterized further to include shock absorbing means within said testing apparatus and arranged between said valve means and said mandrel means to dampen sudden movements of said mandrel means with respect to said valve means and to transmit said dampened movements to said valve means.

7. The apparatus of claim 3 wherein said impedance means further comprises hydraulic impedance means, said hydraulic impedance means including distensible sleeve means slidably located in said testing apparatus housing means and arranged to coact with said mandrel means to provide a preselectively adjustable metering orifice therebetween; hydraulic chamber means in said testing apparatus located adjacent said sleeve means in said testing apparatus located adjacent said sleeve means and arranged to receive hydraulic impedance fluid and further arranged to slidably receive said sleeve means in distended sealing relation during [upward] movement of said mandrel means with respect to said housing means *toward the contracted position* and, alternately, in non-sealing relation during [downward] movement of said mandrel means with respect to said housing means *toward the expanded position*; and bypass means in said chamber means arranged to provide hydraulic fluid bypass means around said metering orifice upon a predetermined amount of slidable movement of said sleeve means in said chamber means.

8. Apparatus for testing the productivity of oil bearing formations penetrated by a borehole, said apparatus comprising:

housing means arranged to be inserted into a string of testing tools and drill tubing; said housing means having a substantially open bore therethrough;

mandrel means slidably attached to said housing means and adapted to telescope selectively with respect to said housing means and coaxially aligned therewith; said mandrel means having a substantially open bore therethrough; said mandrel means further comprising an elongated bore, generally cylindrical, tubular mandrel assembly slidably and concentrically located within said housing means; and an upper, generally cylindrical, tubular mandrel assembly slidably and concentrically located within said housing means and adapted to receive said lower mandrel assembly in selectively disconnectable, telescopic relationship therewith; said upper mandrel assembly arranged to move upward in response to upward movement of said lower mandrel means after a certain predetermined amount of upward telescopic movement of said lower mandrel assembly into said upper mandrel assembly;

valve means in said housing means arranged to be activated by said mandrel means at a preselected moment; said valve means arranged to open and close said open bore through said housing means; and means for activating said valve means in response to reciprocation of said string of testing tools in said borehole.

9. Apparatus for testing the productivity of oil bearing formations penetrated by a borehole, said apparatus comprising:

housing means arranged to be inserted into a string of testing tools and drill tubing; said housing means having a substantially open bore therethrough;

mandrel means slidably attached to said housing means and adapted to telescope selectively with respect to said housing means and coaxially aligned therewith; said mandrel means having a substantially open bore therethrough;

valve means in said housing means arranged to be activated by said mandrel means at a preselected moment; said valve means arranged to open and close said open bore through said housing means; and means for activating said valve means in response to reciprocation of said string of testing tools in said borehole said activating means comprising pin sleeve means located slidably within said housing means, said pin sleeve means having a plurality of pins thereon adapted to engage said valve means; drive sleeve means attached to said pin sleeve means and adapted to telescope with respect to said mandrel means; and linkage means between said drive sleeve means and said mandrel means and arranged to abut loosely said mandrel means and said drive sleeve means.

10. The apparatus of claim 8 further comprising J-slot means in said housing means, and lug means on said lower mandrel assembly, said lug means arranged to engage said J-slot means in said housing means and travel within said J-slot means in response to relative movement of said housing means with respect to said lower mandrel assembly; said J-slot means adapted to provide upper and lower travel limit stops in said housing means for limiting vertical movements of said housing means with respect to said lower mandrel assembly.

11. An oil well testing tool having a fully opening axial bore, said testing tool being capable of opening and closing an indefinite number of times, comprising:

a cylindrical tubular external housing assembly adapted at its upper end to be interconnected in a tubing string or string of testing tools; said assembly having a plurality of ports through the wall thereof, and a plurality of inner annular recesses therein;

an upper inner mandrel assembly slidably and concentrically located within said housing assembly; said mandrel assembly being generally cylindrical and tubular and having a plurality of ports through the wall thereof; said mandrel assembly further arranged with respect to said housing assembly to form annular chambers therebetween, and said mandral assembly having a plurality of differential pressure areas thereon;

a tubular, generally cylindrical, lower mandrel assembly slidably and concentrically located within said housing assembly below said upper mandrel assembly and adapted to coact with said upper mandrel assembly upon axial movement of said lower mandrel assembly within said housing assembly; said lower mandrel assembly being adapted at its lower end to interconnect into a string of test tools or tubing string;

a valve member having a substantially large axial bore therethrough, said member arranged within said housing assembly and adapted in one position of said member to communicate said axial bore coaxially with the bore of said tubular housing assembly and the bores of said tubular mandrel assemblies, said valve member further adapted to be actuated by vertical movement of said mandrel assemblies with respect to said valve member; and activating means within said testing tool arranged to coact with said valve member and said upper mandrel assembly by receiving vertical reciprocations of said upper mandrel assembly and transmitting said reciprocations to said valve member in order to open and close said valve member bore to said bore passages in said housing and mandrel assemblies.

12. The testing tool of claim 11 further comprising:

impedance means between said housing assembly and said lower mandrel assembly, said impedance means arranged to impede but not prevent movement of said lower mandrel assembly upward in said housing assembly;

hydrostatic pressure balancing means within said testing tool and arranged to prevent premature telescoping of said upper and lower mandrel assemblies into said housing assembly; and, spring dampening means on said activating means arranged to dampen upward movements of said upper mandrel assembly and transmit said dampened movements to said valve member.

13. The apparatus of claim 11 further comprising:

spring biasing means between said lower mandrel assembly and said housing assembly and arranged to provide a biasing force tending to maintain said lower mandrel assembly extended out of said housing assembly a maximum predetermined distance; and J-slot limit stop means in said testing tool, said J-slot means further comprising a J-slot groove in said housing assembly; and, located on said lower mandrel assembly, a rotatable lug ring having lug projection means thereon for engaging in said J-slot groove.

*14. The apparatus of claim 5 wherein said flow tube and said valve means further comprises:*

*a first tubular sleeve in the open bore of said housing means and having an open bore therethrough axially aligned and communicating with the open bore of said housing means, said first sleeve being secured at one end to said housing means to prevent axial and rotatable movement of said first sleeve with respect to said housing means;*

*said rotatable ball valve at the second end of said first tubular sleeve arranged such that when in said one position its cylindrical bore is aligned and communicates with the open bore through said first sleeve, thereby communicating with said axially aligned open bore through said housing means;*

*a second tubular sleeve in the open bore of said housing means and positioned such that said rotatable ball valve is axially aligned with and between said first tubular sleeve and said second tubular sleeve; said second tubular sleeve having an open bore therethrough axially aligned and communicating with the open bore through said housing means and the cylindrical bore through said rotatable ball valve when said ball valve is in said one position, said second tubular sleeve further having an annular recess in the end adjacent said rotatable ball valve;*

*valve seating means within said annular recess for forming a fluid tight seal between said rotatable ball valve and said second tubular sleeve when said rotatable ball valve is in said second position; and*

*connecting means connecting said first tubular sleeve to said second tubular sleeve, passing around said rotatable ball valve and arranged to allow said activating means to move said rotatable ball valve between said one position and said second position.*

*15. The apparatus of claim 14 further comprising spring biasing means within said second tubular sleeve for biasing said valve seating means into said rotatable ball valve.*

*16. The apparatus of claim 14 wherein said activating means includes activating sleeve means connected to said rotatable ball valve, and located between said housing means and said second tubular sleeve, and extending from adjacent said rotatable ball valve beyond said second tubular sleeve in the axial direction, for moving said rotatable ball valve between said one position and said second position.*

*17. The apparatus of claim 16 wherein said first tubular sleeve has lateral ports through the wall thereof for providing fluid communcation between the open bore through said first tubular sleeve and an annular space between said first tubular sleeve and said housing means, and wherein an annular space is provided between said second tubular sleeve and said housing means in fluid communication with said annular space between said first tubular sleeve and said housing means forming a bypass channel around said rotatable ball valve; and*

*bypass valve means in said activating sleeve means operably by sliding movement of said mandrel means for controlling fluid communication between said bypass channel and the open bore through said mandrel means at a preselected time.*

*18. An apparatus for use with a string of testing tools and drill tubing which extends within a borehole from the surface of the earth to an oil bearing formation for testing the productivity of the oil bearing formation, said apparatus comprising:*

*housing means having a substantially open bore therethrough;*

*mandrel means having an open bore therethrough and slidably received in a portion of the open bore of said housing means and coaxially aligned therewith; said mandrel means operable from the surface of the earth for sliding movement within said housing means;*

*a first tubular sleeve in a first portion of the open bore of said housing means, having an open bore therethrough axially aligned and communicating with the open bore of said housing means, said first sleeve being secured at one end to said housing means to prevent axial movement of said first sleeve with respect to said housing means;*

*a second tubular sleeve in a second portion of the open bore of said housing means, having an open bore therethrough, and spaced in the axial direction from and axially aligned with the second end of said first tubular sleeve to form a fluid flow passage which includes the open bore of said housing means, the open bores of said first and second sleeves, and the open bore of said mandrel means;*

*a rotatable ball valve in the space between said first tubular sleeve and said second tubular sleeve, having a relatively large, open, cylindrical bore passing therethrough; said rotatable ball valve arranged in one position to align said cylindrical bore with said flow passage for opening said flow passage, and arranged in a second position to isolate said cylindrical bore from said flow passage for closing said flow passage;*

*valve seating means between one of said tubular sleeves and said rotatable ball valve for forming a fluid tight seal between said rotatable ball valve and said one tubular sleeve when said rotatable ball valve is in said second position;*

*activating means interconnecting said mandrel means and said rotatable ball valve for moving said rotatable ball valve between said one position and said second position responsive to sliding movement of said mandrel means; connecting means connecting said first tubular sleeve to said second tubular sleeve, passing around said rotatable ball valve and arranged to allow said activating means to move said rotatable ball valve between said one position and said second position and further arranged to allow limited movement of said second tubular sleeve with respect to said rotatable ball valve; and*

*sealing means between said second tubular sleeve and said housing means for providing a fluid tight seal therebetween, and operable to provide a pressure responsive area on said second tubular sleeve for providing a force on said second tubular sleeve for moving said second tubular sleeve into tight engagement with said rotatable ball valve when a pressure in said second portion of said housing open bore is higher than the pressure in said first portion of said housing open bore.*

*19. The apparatus of claim 18 further comprising spring biasing means within said second tubular sleeve for biasing said valve seating means and said rotatable ball valve into pressure sealing engagement.*

*20. The apparatus of claim 18 wherein said activating means includes activating sleeve means connected to said*

*rotatable ball valve, and located between said housing means and said second tubular sleeve, and extending from adjacent said rotatable ball valve beyond said second tubular sleeve in the axial direction, for moving said rotatable ball valve between said one position and said second position.*

*21. The apparatus of claim 20 wherein said valve seating means is between said second tubular sleeve and said rotatable ball, wherein said first tubular sleeve has lateral ports through the wall thereof for providing fluid communication between the open bore through said first tubular sleeve and an annular space between said first tubular sleeve and said housing means, and wherein an annular space is provided between said second tubular sleeve and said housing means in fluid communication with said annular space between said first tubular sleeve and said housing means forming a bypass channel around said rotatable ball valve; and*

*bypass valve means in said activating sleeve means operable by sliding movement of said mandrel means for controlling fluid communication between said bypass channel and the open bore through said mandrel means at a preselected time.*

*22. The apparatus of claim 21 further comprising impedance means between said housing means and said mandrel means for impeding movement of said mandrel means in the opening direction which causes said rotatable ball valve to move to said one position, and for providing substantially no impedance to movement of said mandrel means in the closing direction which causes said rotatable ball valve to move to said second position.*

*23. The apparatus of claim 22 further comprising J-slot and coengaging means between said mandrel means and said housing means for alternately limiting and allowing movement of said mandrel means in the opening direction such that said rotatable ball valve is moved to said one position only on every other movement of said mandrel means in the opening direction.*

*24. Apparatus for testing the productivity of an oil bearing formation penetrated by a borehole having a testing string therein extending from the surface of the earth to a packer isolating said formation, said apparatus comprising:*

*housing means having an open bore therethrough;*

*mandrel means having an open bore therethrough coaxially aligned with and slidably received in the open bore of said housing means, with one of said housing means and said mandrel means being arranged to be connected to that portion of the testing string extending to the surface and the other of said housing means and said mandrel means being arranged to be connected to that portion of the testing string extending to the packer for providing slidable movement of said mandrel means with respect to said housing means between a contracted position and an expanded position during vertical reciprocal movement of said testing string;*

*a flow tube in the open bore of said housing means having a single end connected to the interior wall of said housing means for providing an open flow path through the open bore of said housing means, said flow path communicating with the open bore of said mandrel means;*

*valve means in said flow tube movable between an open condition and a closed condition for opening and closing the flow path through said flow tube; and*

*valve activating means having a portion extending between the interior wall of said housing means and the periphery of the unconnected end of said flow tube, and connecting said mandrel means and said valve means for moving said valve means to the closed condition when said mandrel means and said housing means are in the expanded position and for moving said valve means to the open condition when said mandrel means and said housing means are in the contracted position.*

* * * * *